US012448038B2

(12) United States Patent
Chen et al.

(10) Patent No.: US 12,448,038 B2
(45) Date of Patent: Oct. 21, 2025

(54) STEERING WHEEL STRUCTURE FOR AN OMNIDIRECTIONAL MOBILE ROBOT CHASSIS

(71) Applicant: Beihang University, Beijing (CN)

(72) Inventors: Juan Chen, Beijing (CN); Jingkun Wei, Beijing (CN); Min Yang, Beijing (CN); Qingzhen Zhang, Beijing (CN); Langfu Cui, Beijing (CN); Changlin Wu, Beijing (CN); Shicheng Zheng, Beijing (CN)

(73) Assignee: Beihang University, Beijing (CN)

( * ) Notice: Subject to any disclaimer, the term of this patent is extended or adjusted under 35 U.S.C. 154(b) by 398 days.

(21) Appl. No.: 18/127,684

(22) Filed: Mar. 29, 2023

(65) Prior Publication Data
US 2023/0373559 A1 Nov. 23, 2023

(30) Foreign Application Priority Data

Mar. 29, 2022 (CN) .......................... 202210348072.X

(51) Int. Cl.
B62D 7/02 (2006.01)
B60K 7/00 (2006.01)
(Continued)

(52) U.S. Cl.
CPC ............ B62D 7/023 (2013.01); B60K 7/0007 (2013.01); B62D 5/0421 (2013.01); B62D 15/0245 (2013.01)

(58) Field of Classification Search
CPC ................................. B62D 7/023; B60K 7/0007
See application file for complete search history.

(56) References Cited

U.S. PATENT DOCUMENTS 4,657,104 A * 4/1987 Holland .............. B60B 33/0057
180/211
4,733,737 A * 3/1988 Falamak ................ B62D 57/00
180/7.1
(Continued)

FOREIGN PATENT DOCUMENTS

CN 204214401 U 3/2015
CN 206282138 U 6/2017
(Continued)

Primary Examiner — Jeffrey J Restifo
(74) Attorney, Agent, or Firm — Bayramoglu Law Offices LLC

(57) ABSTRACT

A steering wheel structure for an omnidirectional mobile robot chassis is provided. The steering wheel structure can realize two degrees of freedom: the rudder rotation of the steering wheel rotation and the full free movement realized in the horizontal plane, it has the characteristics of a small size and a lower height. The wheel assembly realizes the movement of the steering wheel when it moves forward; the rudder assembly realizes the movement of the steering wheel when the steering wheel rotates, initializes the steering direction, and calibrates the rotation through the zero position sensor; the suspension assembly realizes the damping and buffering of the longitudinal motion of the steering wheel; the wiring assembly constrains the movement of various wires when the rudder rotates; the support plate is used for the connection and support of the wheel assembly and the wiring assembly with the rudder assembly.

8 Claims, 3 Drawing Sheets

(51) Int. Cl.
  *B62D 5/04*       (2006.01)
  *B62D 15/02*      (2006.01)

(56)           References Cited

U.S. PATENT DOCUMENTS

|   |   |   |   |   |
|---|---|---|---|---|
| 4,815,008 | A * | 3/1989 | Kadonoff | G05D 1/027 |
|   |   |   |   | 180/169 |
| 8,662,234 | B2 * | 3/2014 | Roeder | B62D 5/0418 |
|   |   |   |   | 180/6.44 |
| 9,329,597 | B2 * | 5/2016 | Stoschek | G05D 1/0297 |
| 9,359,005 | B2 * | 6/2016 | Doan | B60K 17/303 |
| 9,579,927 | B2 * | 2/2017 | Parrott | B60B 19/003 |
| 9,586,471 | B2 * | 3/2017 | Gillett | B62K 21/26 |
| 12,157,339 | B2 * | 12/2024 | Chen | B60G 1/00 |
| 2004/0112656 | A1 * | 6/2004 | Bowen | B60K 17/046 |
|   |   |   |   | 180/65.51 |
| 2010/0243344 | A1 * | 9/2010 | Wyrobek | B25J 19/0016 |
|   |   |   |   | 180/21 |
| 2021/0162857 | A1 |  6/2021 | Obermeyer et al. |   |
| 2023/0166793 | A1 * | 6/2023 | Degen | B62D 7/04 |
|   |   |   |   | 701/41 |
| 2023/0311602 | A1 * | 10/2023 | Chen | B62D 7/023 |
|   |   |   |   | 280/124.17 |
| 2023/0373559 | A1 * | 11/2023 | Chen | B62D 5/0418 |

FOREIGN PATENT DOCUMENTS

| CN | 108216422 A | 6/2018 |
| CN | 208263889 U | 12/2018 |
| CN | 110040194 A | 7/2019 |
| CN | 216101515 U | 3/2022 |

* cited by examiner

STEERING WHEEL STRUCTURE FOR AN OMNIDIRECTIONAL MOBILE ROBOT CHASSIS

CROSS REFERENCE TO THE RELATED APPLICATIONS

This application is based upon and claims priority to Chinese Patent Application No. 202210348072.X, filed on Mar. 29, 2022, the entire contents of which are incorporated herein by reference.

TECHNICAL FIELD

The present invention belongs to the field of robotics, in particular to a steering wheel structure for an omnidirectional mobile robot chassis, which can realize the rudder rotation and the wheel rotation simultaneously, and meet the needs of high acceleration, high speed, and omnidirectional movement of the robot chassis.

BACKGROUND

Small robots with a mass of less than 50 kg need a fast response in all directions to meet the flexibility requirements of robot actuation. In robot competition, the speed and acceleration of the wheel are the key factors affecting the performance of the competition.

Although the traditional orthogonal omnidirectional wheels and Mecanum wheels can meet the omnidirectional movements, the rotation direction of all wheels cannot always be consistent with the forward direction when they move omnidirectionally, and the contact area between the small rollers arranged on them and the ground is small, which makes the friction force insufficient, resulting in a smaller maximum acceleration for both wheels. Compared with the above two traditional omnidirectional wheels, the steering wheel not only satisfies the omnidirectional movement of the robot chassis but also has a higher speed and acceleration, which is excellent in robot competition.

The overall height of the steering wheel used in the small robots is too high, it will occupy more upper space of the robot during assembly, resulting in a slightly cramped space of the upper mechanism of the robot, limiting the layout of the robot's functional mechanism and the specific range of functional activities. At the same time, the integration of these steering wheels is also low, and the installation is too cumbersome. It is impossible to disassemble quickly when repairing or replacing.

SUMMARY

Because of the above problems of the steering wheel, the new steering wheel structure for an omnidirectional mobile robot chassis proposed by the present invention has a high speed and acceleration, a low layout height, a high integration, and convenient installation.

The present invention relates to a steering wheel structure for an omnidirectional mobile robot chassis, which includes five parts: a wheel assembly, a support plate, a wiring assembly, a rudder assembly, and a suspension assembly. The wheel assembly and the wiring assembly are installed on the support plate; the rudder assembly has an inner ring and an outer ring, and the support plate is connected with the inner ring of the rudder assembly. The suspension assembly is connected with the outer ring of the rudder assembly; the wiring assembly and the wheel assembly are located in the rotation center of the rudder assembly. The steering wheel structure for an omnidirectional mobile robot chassis contains two degrees of freedom: a rudder rotation of the steering wheel rotation and a full free movement realized in the horizontal plane.

The wheel assembly includes a wheel drive motor, a wheel bracket, wheels, a reducer, and an encoder. The wheel drive motor and reducer are integrated inside the wheels, which are located on both sides of the wheels and arranged coaxially with the wheels. The wheel drive motor outputs and connects to the reducer to drive the wheel; the wheel drive motor is installed on one side of the wheel bracket, and the reducer and encoder are installed on the other side of the wheel bracket. The wheel bracket is installed on the support plate; the encoder is used to detect the rotation angle of the motor for closed-loop control of the motor.

The support plate is used for the structural connection of the wheel assembly, the wiring assembly, and the rudder assembly. The outer side of the support plate is connected to the rudder assembly, and the inner side is connected to the wheel assembly and the wiring assembly. The support plate rotates with the rudder, which plays a supporting role in the steering wheel rotation part including the wheel assembly and the wiring assembly.

The wiring assembly is composed of a wiring support frame and a wiring coil. The wiring coil is concentric with the rudder bearing and is located on the top layer of the steering wheel. The wiring coil is installed on the wiring support frame, and the wiring support frame is installed on the support plate. The wire drawn by the steering wheel motor and encoder is drawn along the wiring support frame through the wiring coil directly above the steering wheel, which can prevent the wire from winding on the steering wheel when the steering wheel rotates.

The rudder assembly includes a rudder drive motor, a zero position sensor, a rudder motor bracket, an induction trigger screw, a motor pinion, an inner ring gear, an inner ring of the rudder assembly, an outer ring of the rudder assembly, a dust-proof plate, a rudder bearing, etc. The rudder bearing undertakes the rudder rotation, and the inner and outer rings of the rudder bearing are connected to the inner and outer ring of the rudder assembly respectively. The inner gear ring is installed on the outer ring of the rudder assembly. The rudder drive motor is installed on the inner ring of the rudder assembly through the rudder motor bracket. The rudder drive motor shaft connects the motor pinion to mesh with the inner gear ring, drives the support plate to rotate, and realizes the rudder steering. The zero position sensor is installed on the outer ring of the rudder assembly, and the corresponding induction trigger screw is installed on the rudder motor bracket. The rudder motor bracket rotates to trigger the zero position sensor at the same position once a round. When the sensor is triggered, the steering wheel is regarded as returning to the initial zero position. The dust-proof plate is installed at the bottom of the inner ring of the rudder assembly to cover the rudder bearing and prevent extraneous material from entering the rudder bearing.

The suspension assembly is connected to the outer ring of the rudder assembly to provide longitudinal damping and buffering functions for the steering wheel. The suspension assembly includes four directional connecting beams, which are elastic to absorb vibration and provide a buffer. There are four orthogonally arranged installation holes at the end of the four leaf springs. The advantages of the present invention are:

1. The steering wheel structure for an omnidirectional mobile robot chassis of the present invention adopts the zero position sensor to perform zero return calibration, which can automatically initialize and calibrate the steering wheel when it is powered on, it can realize repeated power-on debugging at any position; In the process of steering wheel rotation, the proximity switch can be triggered to achieve zero calibration when it is in zero position every time, which eliminates the cumulative error of rudder rotation effectively.

2. The steering wheel structure for an omnidirectional mobile robot chassis of the present invention, the highly integrated design of the steering wheel and the wheel assembly, and the design of the internal meshing gear and the ring gear are adopted in the steering gear transmission to reduce the height and projection area of the steering wheel, and also reduce the demand of the steering wheel for the upper space of the robot and the transverse space of the chassis, thereby releasing more space for the arrangement of functional components.

3. The steering wheel structure for an omnidirectional mobile robot chassis of the present invention provides four mounting holes located in the orthogonal position. The number of mounting holes is small, and the mounting structure is stable, thereby realizing rapid installation and maintenance.

4. The steering wheel structure for an omnidirectional mobile robot chassis of the present invention adopts the design of the traveling ring so that the motor line and the encoder line can be self-entwined in the traveling ring when the steering wheel rotates in the steering direction, preventing the wire from winding to other parts of the steering wheel.

Marks in the figures: 1 is the wheel assembly, 1-1 is the wheel drive motor, 1-2 is the wheel bracket, 1-3 is the wheel, 1-4 is the reducer, 1-5 is the encoder; 2 is the support plate, 2-1 is the main drive motor, 2-2 is the reducer, 2-3 is the rotating shaft, 2-4 is the bearing shell, 2-5 is the bearing; 3 is the wiring assembly, 3-1 is the wiring support frame, 3-1-1 is the horizontal plate, 3-1-2 is the side plate, 3-1-3 is the stud, 3-2 is the wiring coil, 3-3 is the wheel motor line, 3-4 is the encoder line; 4 is the rudder assembly, 4-1 is the rudder drive motor, 4-2 is the zero position sensor, 4-2-1 is the sensor bracket, 4-3 is the rudder motor bracket, 4-4 is the induction trigger screw, 4-4-1 is the induction trigger screw bracket, 4-5 is the motor pinion, 4-6 is the inner ring gear, 4-7 is the inner ring of the rudder assembly, 4-8 is the outer ring of the rudder assembly, 4-9 is the dust-proof plate, 4-10 is the rudder bearing. 5 is the suspension assembly, 5-1 is the steering wheel mounting hole.

DETAILED DESCRIPTION OF THE EMBODIMENTS

Figure 1:
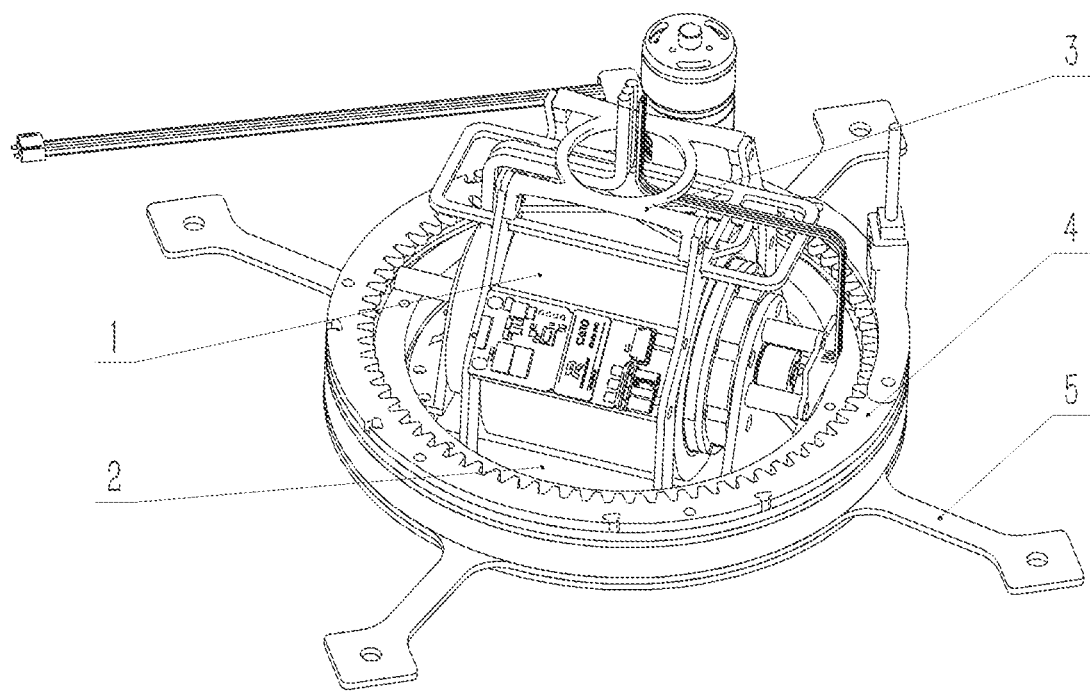
FIG. 1 is the structure diagram of the steering wheel module for the omnidirectional mobile robot chassis.

The following is a further detailed description of the present invention in combination with drawings and specific embodiment:

The present invention relates to a steering wheel structure for an omnidirectional mobile robot chassis, including the wheel assembly 1, the support plate 2, the wiring assembly 3, the rudder assembly 4, and the suspension assembly 5, as shown in FIG. 1.

Figure 2:
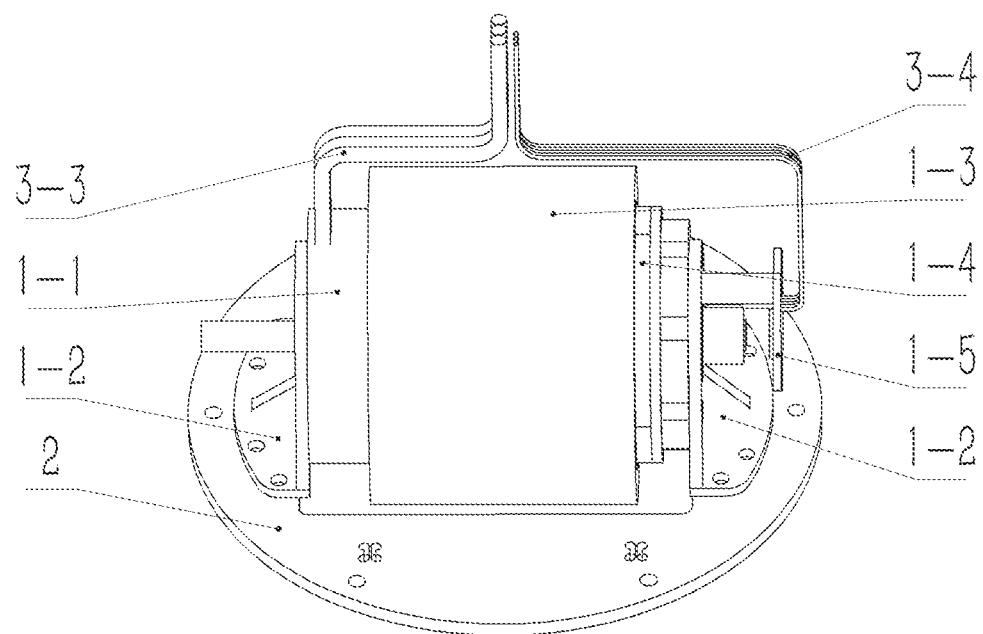
FIG. 2 is the cutting diagram of the wheel assembly in the steering wheel module for the omnidirectional mobile robot chassis.

The wheel assembly 1 includes the wheel drive motor 1-1, the wheel bracket 1-2, the wheel 1-3, the reducer 1-4, and the encoder 1-5. The wheel drive motor 1-1 and the reducer 1-4 are placed inside the wheel 1-3, which are coaxially arranged and located on both sides of the wheel spoke plate, and the three components constitute the wheel group together; the wheel drive motor 1-1 drives the wheel 1-3 after the reducer 1-4 decelerates to realize the rotation of the wheel 1-3; the wheel drive motor 1-1 is installed on the side of the wheel bracket 1-2, the reducer 1-4 and the encoder 1-5 are installed on the other side of the wheel bracket 1-2, and the wheel bracket 1-2 is installed on the support plate 2. The encoder 1-5 is installed on the wheel bracket 1-2 on the 1-4 side of the reducer, which is used to detect the rotation angle of the wheel drive motor 1-1 to provide position feedback for closed-loop control. The wheel drive motor 1-1 will lead to the wheel motor line 3-3, and the encoder 1-5 will lead to the encoder line 3-4, as shown in FIG. 2.

The support plate 2 is a hollow structure with an outer circle and an inner square, and the material is carbon fiber. The hollow square hole is used to make the wheel contact with the ground through the wheel assembly. The support plate 2 is used for the structural connection of the wheel assembly 1 and the wiring assembly 3 with the rudder assembly 4. The outer side of the support plate 2 is connected to the inner ring of the rudder assembly 4-7 of the rudder assembly 4, and the inner side is connected to the wheel assembly 1 and the wiring assembly 3. The support plate 2 rotates with the rudder to support the steering wheel rotation part including the wheel assembly 1 and the wiring assembly 3.

Figure 3:
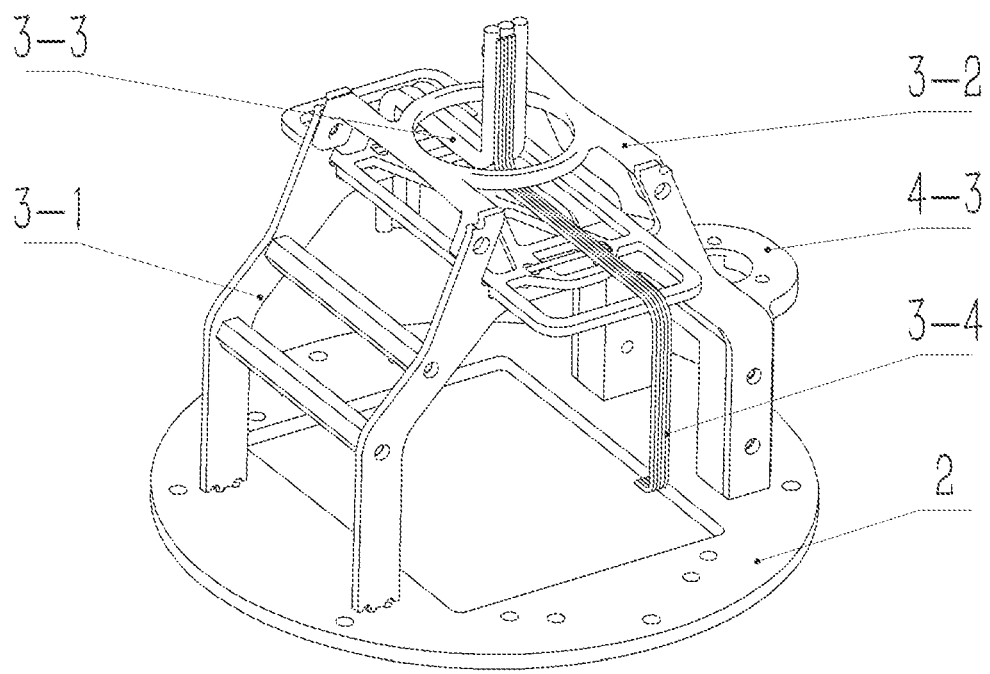
FIG. 3 is the structure diagram of the wiring assembly in the steering wheel module for the omnidirectional mobile robot chassis.

The wiring assembly 3 is composed of the wiring support frame 3-1 and wiring coil 3-2. The wiring coil 3-2 is concentric with the support plate 2, so it is concentric with the rudder bearing 4-10 and is located at the top of the rudder wheel. The wiring coil 3-2 is installed on the wiring support frame 3-1. The track support frame 3-1 is installed on the support plate 2, and the wheel motor line 3-3 and the encoder line 3-4 are drawn from the top of the steering wheel along the track frame 3-1 through the coil 3-2. One end of the wire is fixed on the horizontal plate 3-1-1 of the support frame 3-1 under the wiring coil 3-2, and the other end is fixed above the steering wheel. The motor wire will be bound in the coil when it is wound to prevent the wire from winding to other structures on the steering wheel when the steering wheel rotates. At the same time, the motor wire is reserved for a certain additional length to provide the margin required for wire winding, and there will be no disconnection in the limited angle range, as shown in FIG. 3.

Figure 4:
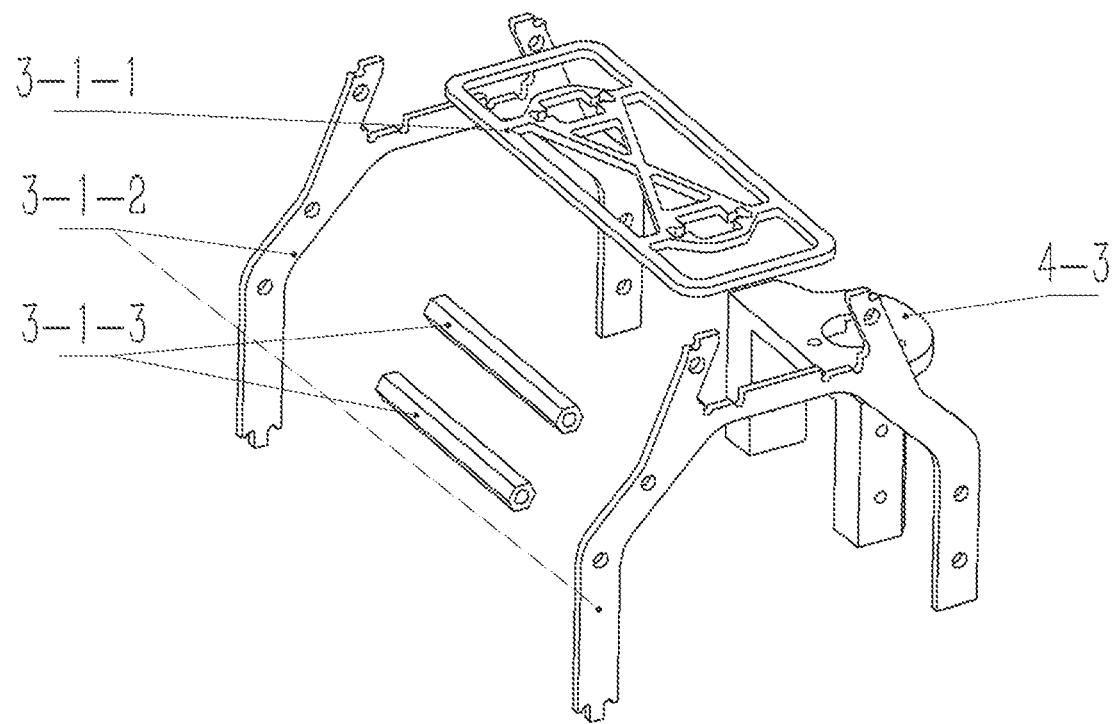
FIG. 4 is the explosion diagram of the wiring support frame in the steering wheel module for the omnidirectional mobile robot chassis.

The wiring support frame 3-1 is composed of a horizontal plate 3-1-1, a side plate 3-1-2, studs 3-1-3, and a door-type rudder motor bracket 4-3 connected. The horizontal plate 3-1-1 and the side plate 3-1-2 are carbon fiber materials with light weight. The side plate 3-1-2 is a door-type with upper narrowing and a lower equal width. One side of the door pillar of the side plate 3-1-2 is connected to both sides of the rudder motor bracket 4-3, and the other side of the door pillar is connected by two studs 3-1-3. The transverse plate 3-1-1 is a rectangle with a hollow weight-reducing hole inside, which is connected to the middle and upper parts of the plate 3-1-2 on both sides, as shown in FIG. 4.

The rudder assembly 4 includes a rudder drive motor 4-1, a zero position sensor 4-2, a rudder motor bracket 4-3, an induction trigger screw 4-4, a motor pinion 4-5, an inner ring 4-6, an inner rudder bearing bracket 4-7, an outer rudder bearing bracket 4-8, a dust-proof plate 4-9, a rudder bearing 4-10, etc. The rudder bearing 4-10 undertakes the rudder rotation function. The inner and outer rings of the bearing are connected to the inner ring of the rudder assembly 4-7 and the outer ring of the rudder assembly 4-8 respectively. The inner gear ring 4-6 is installed on the outer ring of the rudder assembly 4-8. The rudder drive motor 4-1 is installed on the support plate 2 through the rudder motor support 4-3. The support plate 2 is connected to the inner ring of the rudder assembly 4-7. The rudder drive motor 4-1 outputs and connects the motor pinion 4-5 to the inner gear ring 4-6, and drives the support plate 2 to rotate for rudder steering. The zero position sensor is installed on the outer ring of the rudder assembly 4-8, and the induction trigger screw 4-4 that can trigger the zero position sensor 4-2 is installed on the rudder motor bracket 4-3 through the induction trigger screw bracket 4-4-1, and the zero position sensor 4-2 is installed on the outer ring of the rudder assembly 4-8 through the sensor bracket 4-2-1; the dust-proof plate 4-9 is installed at the bottom of the inner ring of the rudder assembly 4-7, covering the rudder bearing and preventing the extraneous material from entering the rudder bearing, as shown in FIG. 4.

In the above rudder assembly 4, the outer ring of the rudder assembly 4-8 is a fixed part, and the inner ring of the rudder assembly 4-7 is a rotating part; when the rudder rotates, the inner ring of the rudder assembly 4-7 rotates relative to the outer ring of the rudder assembly 4-8, and drives other parts on the inner ring of the rudder assembly to rotate, including the support plate 2, the wheel assembly 1, the wiring assembly 3 and rudder motor bracket 4-3.

The zero position sensor 4-2 can only be triggered by the induction trigger screw 4-4, and the zero position sensor 4-2 will only trigger the zero position sensor 4-2 once at the same position, which is the relative position of the rudder within a round. Therefore, when the zero position sensor 4-2 is triggered, the steering wheel is regarded as returning to the initial zero position; under the zero trigger mode, the steering wheel can be powered up at any rudder position. Under the control of the initialization program, the steering drive motor 4-1 drives the inner ring of the rudder assembly 4-7 unidirectional rotation and stops when the zero position sensor 4-2 is triggered to complete the zero rudder calibration. During the operation of the steering wheel, each trigger zero position sensor 4-2 can complete a zero calibration of the rudder to eliminate the cumulative error.

Figure 5:
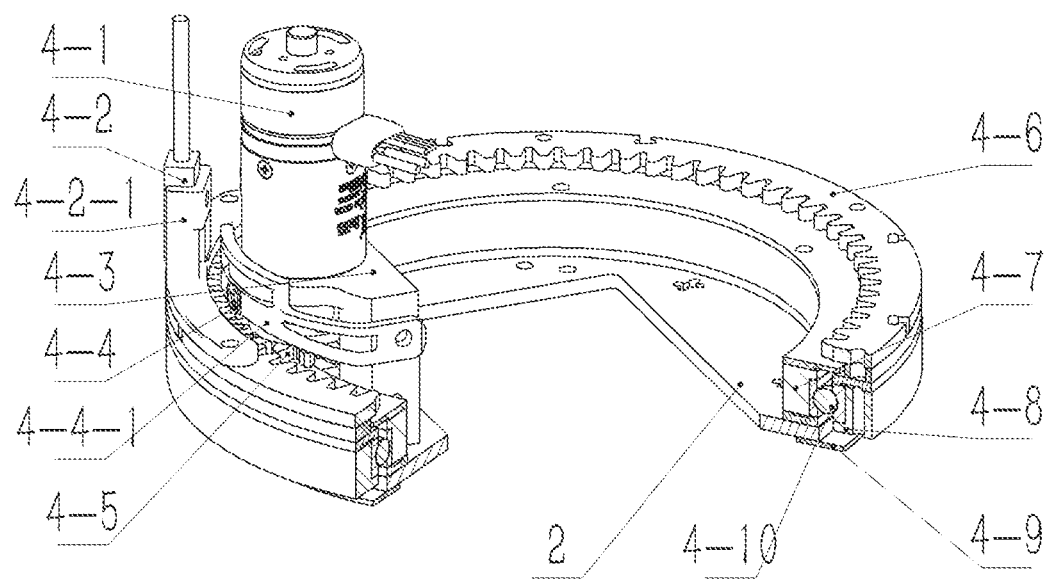
FIG. 5 is the structure diagram of the rudder assembly in the steering wheel module for the omnidirectional mobile robot chassis.
Figure 6:
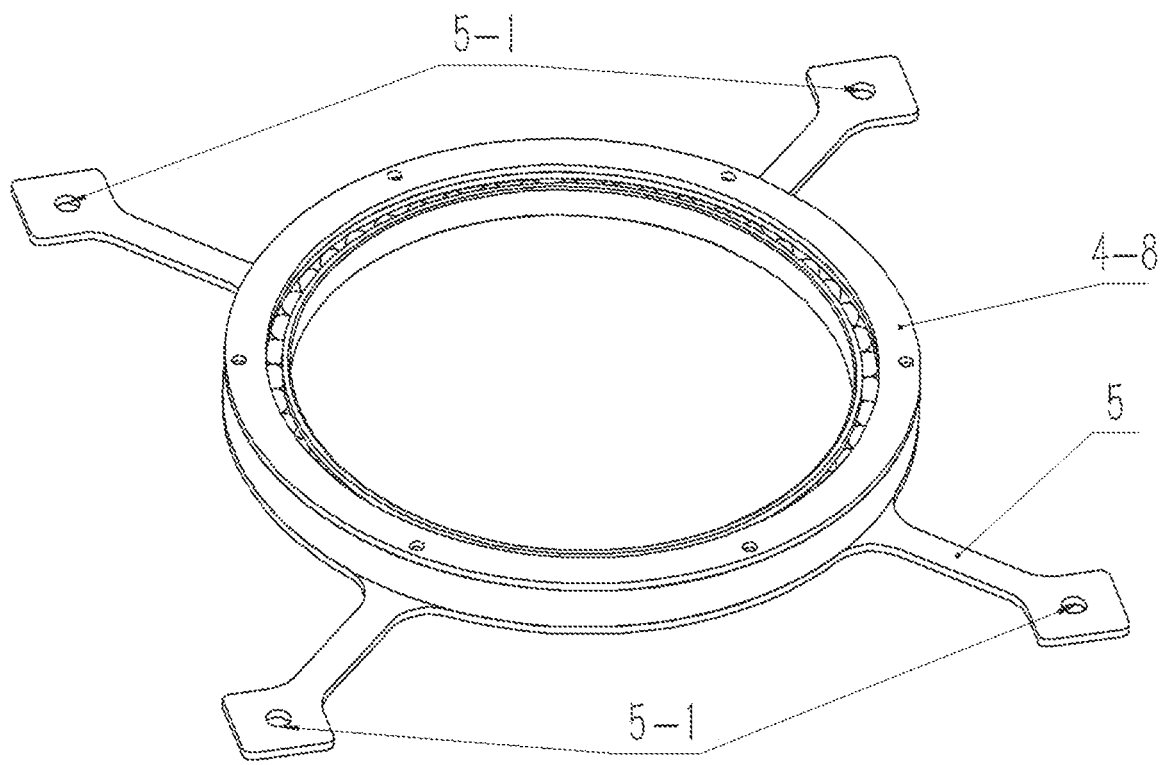
FIG. 6 is the structure diagram of the suspension assembly in the steering wheel module for the omnidirectional mobile robot chassis.

The suspension assembly 5 is connected to the outer ring of the rudder assembly 4-8 to provide longitudinal damping and buffering functions for the rudder wheel. The suspension assembly extends the connecting beam in four directions to absorb vibration and provide buffering. At the end of the four connecting beams, four orthogonally arranged steering wheel mounting holes 5-1 are left at the end of the four connecting beams for the installation and fixation of the steering wheel in the robot chassis, the connection of the four steering wheel mounting holes 5-1 constitutes a square, and the center of its projection overlaps with the center of the steering wheel, as shown in FIG. 5.

What is claimed is:

1. A steering wheel structure for an omnidirectional mobile robot chassis comprising:
   a rudder assembly comprising an inner ring and an outer ring;
   a support plate connected with the inner ring of the rudder assembly;
   a suspension assembly connected with the outer ring of the rudder assembly;
   a wheel assembly, wherein the wheel assembly is installed on the support plate and located in a rotation center of the rudder assembly, the wheel assembly rotates with the support plate to provide a power for a steering wheel to move forward;
   a wiring assembly, wherein the wiring assembly is installed on the support plate and located in the rotation center of the rudder assembly, the wiring assembly rotates with the support plate to constrain a motion of a power line and a signal line when the steering wheel rotates; and
   the steering wheel structure comprises two degrees of freedom: a rudder rotation of a steering wheel rotation and a full free movement realized in a horizontal plane.

2. The steering wheel structure according to claim 1 comprising the rudder assembly, wherein an inner ring of a rudder can rotate relative to an outer ring of the rudder,
   the rudder assembly comprises a rudder drive motor, a zero position sensor, a motor pinion, an inner ring gear, a dust-proof plate, and a rudder bearing;
   the rudder bearing provides a support when the rudder rotates; and
   the rudder drive motor installed on the inner ring of the rudder drives the inner ring of the rudder to rotate relative to the outer ring of the rudder by driving the motor pinion mounted on an output shaft of the rudder drive motor to mesh with the inner ring mounted on the outer ring of the rudder.

3. The steering wheel structure according to claim 2, wherein the zero position sensor is installed on the outer ring of the rudder assembly, and an induction trigger screw corresponding to the zero position sensor is installed on a rudder motor bracket;
   the rudder motor bracket rotates to trigger the zero position sensor at the same position once a round; and
   when the zero position sensor is triggered, the steering wheel is regarded as returning to an initial zero position.

4. The steering wheel structure according to claim 2, wherein the dust-proof plate is installed at a bottom of the inner ring of the rudder assembly to cover the rudder bearing and prevent an extraneous material from entering the rudder bearing.

5. The steering wheel structure according to claim 1, wherein the support plate is connected with the inner ring of the rudder assembly to support the wheel assembly and the wiring assembly,
   the support plate rotates with a rudder, wherein the support plate plays a supporting role in a steering wheel rotation part comprising the wheel assembly and the wiring assembly.

6. The steering wheel structure according to claim 1, wherein the suspension assembly is connected to the outer ring of the rudder assembly to provide longitudinal damping and buffering functions for the steering wheel; the suspension assembly comprises four directional connecting beams, the four directional connecting beams are elastic to absorb a vibration and provide a buffer.

7. The steering wheel structure according to claim 1, wherein the wheel assembly comprises a wheel drive motor, a wheel bracket, wheels, a reducer, and an encoder;
- the wheel drive motor and the reducer are integrated inside the wheels, and the wheel drive motor and the reducer are respectively located on two sides of the wheels and arranged coaxially with the wheels;
- the wheel drive motor outputs and connects to the reducer to drive the wheel;
- the wheel bracket supports the wheel on the support plate; and
- the encoder is configured to detect a rotation angle of the wheel drive motor for a closed-loop control of the wheel drive motor.

8. The steering wheel structure according to claim 1, wherein the wiring assembly comprises a wiring support frame and a wiring coil;
- the wiring coil is concentric with a rudder bearing and is located on a top layer of the steering wheel;
- the wiring coil is installed on the wiring support frame, and the wiring support frame is installed on the support plate;
- a wire is drawn along the wiring support frame through the wiring coil directly above the steering wheel, wherein the wire is drawn by a steering wheel motor and an encoder.

\* \* \* \* \*